Feb. 4, 1936.  W. B. LA POINTE  2,029,824
BUMPER
Filed June 11, 1934
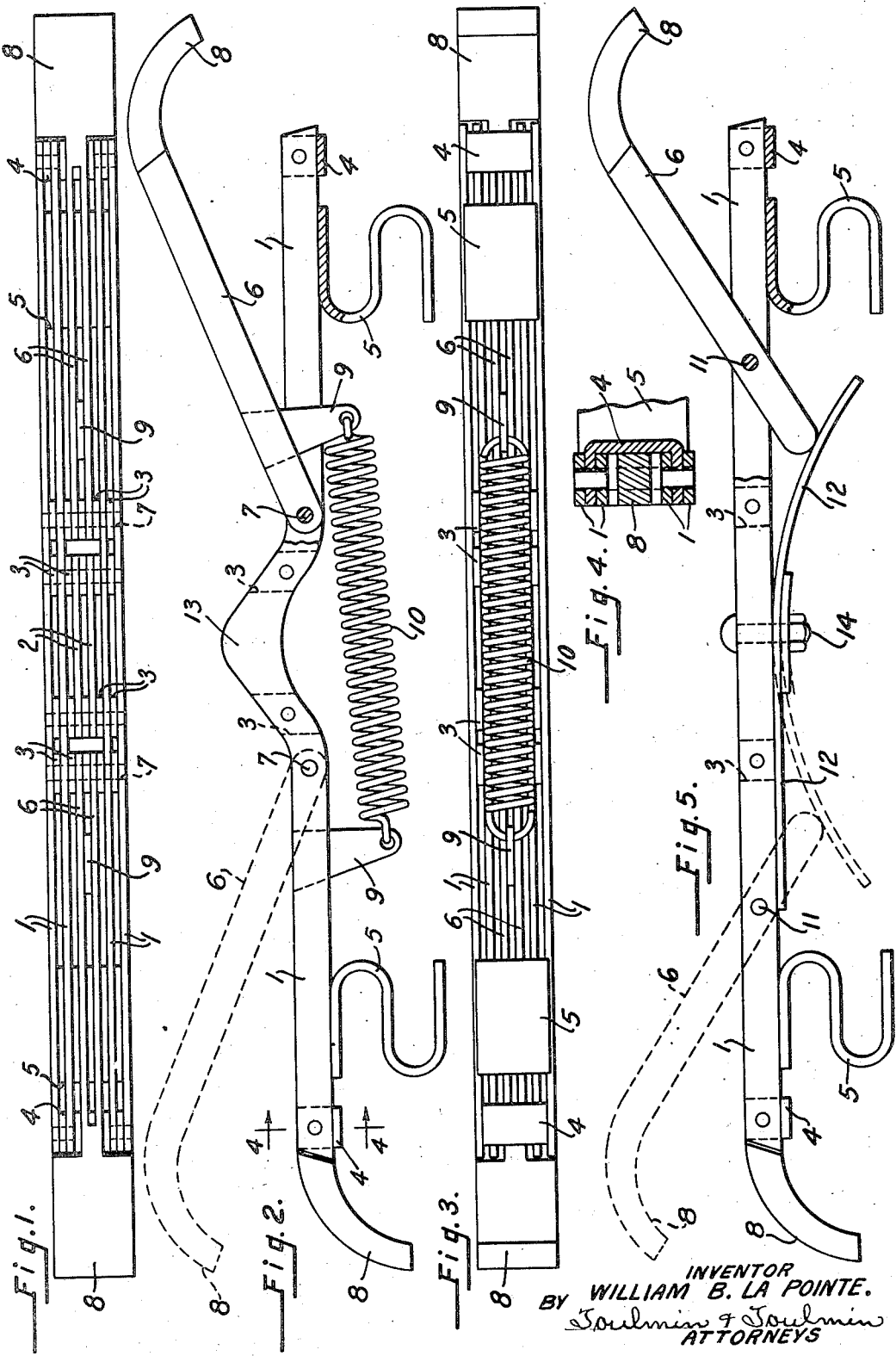
INVENTOR
WILLIAM B. LA POINTE.
BY Toulmin & Toulmin
ATTORNEYS Patented Feb. 4, 1936

2,029,824

UNITED STATES PATENT OFFICE 2,029,824

BUMPER

William B. La Pointe, Los Angeles, Calif., assignor to Louis R. Hildreth, Columbus, Ohio Application June 11, 1934, Serial No. 729,990

9 Claims. (Cl. 293—55)

This invention relates to improvements in bumpers, and has for its object to provide a bumper composed of parts so constructed with relation to one another and so formed that there is produced a streamlined bumper.

It is an object of this invention to provide a bumper composed of an intermediate composite member and end members resiliently mounted upon the intermediate member.

It is an object of this invention to provide a bumper composed of an intermediate member built up of a plurality of parallel bars and end members having bars pivoted to the bars of the intermediate member.

It is also an object to provide a bumper with ends that yield in one direction but are non-yielding in another direction, for protective purposes.

These and other advantages will appear from the following description taken in connection with the drawing.

Referring to the drawing:

Figure 1 is a front elevation of a preferred form of the bumper of this invention.

Figure 2 is a plan view with part of the bumper broken away, and one of the end members out of alignment with the intermediate member.

Figure 3 is a rear elevation of the bumper shown in Figure 1.

Figure 4 is a section on the line 4—4 of Figure 2.

Figure 5 is a view showing a modified form of bumper with parts broken away.

The main parts of the bumper shown in Figures 1 and 5 are identical in their general make-up. The bumper as shown in Figure 1 consists of an intermediate composite part built up of a plurality of sets of spaced longitudinally disposed long bars 1. These sets of bars are held in spaced relationship by means of short parallel bars 2, arranged in spaced relationship between the sets of long bars. All of the bars are held in spaced relationship by means of spacing members 3, which may be any kind of block structure. The long bars form two spaced sets of bars, each set being composed of a pair of bars. The short bars are located intermediate the ends of the long bars and are spaced from each other and from the adjacent long bars by means of spacing members.

To each end of the intermediate member is attached an end member 8. To each end member is attached a pair of spaced bars 6, which have their free ends pivoted to the longitudinal bars by means of a pivot pin 7. Between the bars 6, adjacent the pivots 7, are lugs 9. These lugs are connected by means of a coil spring 10, each end of which is attached to a lug 9.

The bars 1, constituting the composite members of the intermediate member, are connected at their ends by means of a loop 4, which serves as a stop for the bars 6 and also serves to hold the bars 1 in correct position with relation to one another. The bumper as a whole has at each end an S-shaped spring 5, by which it may be attached to the frame of an automobile. These spring members give the bumper a yielding support and add to the protective qualities of the bumper.

The intermediate member composed of the long bars and the short bars, as shown in Figures 1 and 2, has at a point intermediate its ends a U-shaped arch part 13. This, with the arcuate curve of the end members, provides a streamlined construction for the bumper. This streamline effect is increased by the fact that the bumper is built up of a plurality of relatively thin bars, which offer little resistance to the air and which may be shaped so as to decrease the resistance offered by these bars to the air.

In the form shown in Figure 5 the intermediate member of the bumper lacks the arcuate feature, and instead of having the lugs 9 and the coil spring 10, the bars 6 are pivoted intermediate their ends, by means of a pivot pin 11, to the intermediate member of the bumper. The adjacent ends of these bars 6 are engaged by means of a spring 12 supported intermediate its ends, by means of a bolt 14, upon the intermediate member of the bumper.

The position the end members take is shown in full line at the righthand side of Figure 5 and in dotted line at the lefthand side, when the end members are engaged by some other object, such as a passing automobile or the like. If the present bumper be engaged by an automobile passing and cutting in front of the car to which this bumper is attached and which engages one end of the bumper, the bumper will slip off because of the resilient nature of its mounting. If this bumper be used on the rear end of an automobile which passing another car inadvertently engages the front bumper of that car, the bumper will slip off of the engaged bumper.

It will be understood that I desire to comprehend within my invention such modifications as come within the scope of my claims and my invention.

Having thus fully described my invention, what

I claim as new and desire to secure by Letters Patent, is:

1. A bumper comprising an intermediate member composed of spaced sets of spaced superimposed horizontal bars, end members, each end member having thereon a pair of spaced bars pivoted between the sets of spaced bars, each pair of bars having thereon a lug, and a spring acting on the lugs to hold the pairs of bars together.

2. A bumper comprising an intermediate member composed of spaced sets of spaced bars, end members, each end member having thereon a pair of spaced bars pivoted between the sets of spaced bars, a stop at each end of the intermediate member, and means acting to hold the bars of the end members against the stops.

3. In combination, in a bumper, of a plurality of spaced plates arranged in superimposed horizontal planes, means of connecting said plates one to the other, means of resiliently supporting the plates adjacent their ends, and means for yieldingly supporting a plurality of plates pivotally on the first-mentioned plates, the second-mentioned plates extending beyond and to the rear of the first-mentioned plates.

4. In combination in a bumper, a plurality of plates arranged in superimposed spaced relationship, a plurality of plates pivoted therebetween adjacent the ends of the first-mentioned plates, yielding means for resisting the pivotal movement thereof, solid arcuate members constituting the ends of the pivoted plates, and yielding means for supporting either end of the stationary set of plates.

5. A bumper comprising an intermediate member composed of a plurality of flat thin bars with the flat sides superimposed upon one another in spaced parallel relationship, end members yieldingly mounted on the intermediate member, and frame connection members secured to said intermediate member, said end members being each composed of a solid end portion having integral centrally-extending parallel superposed flat thin bars extending between the first mentioned bars, said end members being yieldingly movable in a direction away from said frame connection members.

6. A bumper comprising an intermediate member composed of a plurality of flat thin bars with the flat sides superimposed upon one another in spaced parallel relationship, and end members yieldingly mounted on the intermediate member, said intermediate member having a centrally-disposed U-shaped portion with its arms interspersed between said bars of the intermediate member.

7. A bumper comprising an intermediate member composed of flat thin bars with the flat sides superimposed upon one another in spaced parallel relationship, and end members yieldingly mounted on the intermediate member, each of said end members having a solid portion with its arms interspersed between said bars, the inner ends of said arms carrying lugs, said lugs having said yielding means attached thereto to urge said arms into positions substantially in continuation with said intermediate member.

8. A bumper comprising an intermediate member composed of a plurality of flat thin bars with the flat sides superimposed upon one another in spaced parallel relationship, and end members yieldingly mounted on the intermediate member, each of said end members having a solid arcuate portion with centrally-extending arms interspersed between said bars, the inner ends of said arms carrying lugs, said lugs being interconnected by a common spring.

9. A bumper comprising an intermediate member composed of a plurality of flat thin bars with the flat sides superimposed upon one another in spaced parallel relationship, and end members yieldingly mounted on the intermediate member, each of said end members having a solid arcuate portion with centrally-disposed parallel arms interspersed between said bars, the inner ends of said arms being urged by said yielding means into positions substantially in continuation with said intermediate member.

WILLIAM B. LA POINTE.